US012694065B2

(12) United States Patent
Smith et al.

(10) Patent No.: US 12,694,065 B2
(45) Date of Patent: Jul. 28, 2026

(54) APPARATUS AND A METHOD FOR HEURISTIC RE-INDEXING OF STOCHASTIC DATA TO OPTIMIZE DATA STORAGE AND RETRIEVAL EFFICIENCY

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/960,637

(22) Filed: Nov. 26, 2024

(65) Prior Publication Data

US 2025/0298849 A1 Sep. 25, 2025

Related U.S. Application Data

(63) Continuation of application No. 18/611,982, filed on Mar. 21, 2024, now Pat. No. 12,204,591.

(51) Int. Cl.
G06F 16/906 (2019.01)
G06F 16/901 (2019.01)

(52) U.S. Cl.
CPC ........ G06F 16/906 (2019.01); G06F 16/9027 (2019.01)

(58) Field of Classification Search
CPC ............................ G06F 16/906; G06F 16/9027
USPC .......................................................... 707/739
See application file for complete search history.

(56) References Cited

U.S. PATENT DOCUMENTS

| | | | |
|---|---|---|---|
| 6,731,990 | B1 | 5/2004 | Carter |
| 7,840,498 | B2 | 11/2010 | Frank |
| 9,588,985 | B2 * | 3/2017 | Narasimhamurthy ...................... G06F 16/1858 |
| 10,521,526 | B2 | 12/2019 | Haaland |
| 10,891,701 | B2 | 1/2021 | Jessen |

(Continued)

FOREIGN PATENT DOCUMENTS

| | | |
|---|---|---|
| WO | 03012573 A2 | 2/2003 |
| WO | 2007147166 A2 | 12/2007 |

OTHER PUBLICATIONS

Prado, Thiago Lima, et al., "A direct method to detect deterministic and stochastic properties of data", The New Journal of Physics, vol. 24, Mar. 18, 2022, 20 pages.*

(Continued)

*Primary Examiner* — Robert Stevens
(74) *Attorney, Agent, or Firm* — Caldwell LLC

(57) ABSTRACT

An apparatus for heuristic re-indexing of stochastic data to optimize data storage and retrieval efficiency is disclosed. The apparatus includes at least processor and a memory communicatively connected to the processor. The memory instructs processor to receive raw data including at least two datasets. The memory instructs the processor to generate one or more associations as a function of a statistical model. The memory instructs the processor to reorganize the raw data as a function of the one or more associations. The memory instructs the processor to store the reorganized raw data in an index structure by implementing an indexing system as a function of the one or more associations, wherein the indexing system is further configured to dynamically adjust the index structure in response to additional raw data.

18 Claims, 10 Drawing Sheets

(56)                    References Cited

U.S. PATENT DOCUMENTS

| | | | | |
|---|---|---|---|---|
| 11,847,559 | B2 * | 12/2023 | Antic | G06N 3/08 |
| 11,861,528 | B1 | 1/2024 | Brager | |
| 12,314,777 | B2 * | 5/2025 | Mahadik | G06F 9/5033 |
| 2003/0074251 | A1 | 4/2003 | Kumar | |
| 2004/0073443 | A1 | 4/2004 | Gabrick | |
| 2009/0234899 | A1 * | 9/2009 | Kramer | G06F 16/2465 |
| | | | | 708/200 |
| 2015/0199781 | A1 | 7/2015 | Kim | |
| 2016/0171380 | A1 * | 6/2016 | Kennel | G06N 7/01 |
| | | | | 706/12 |
| 2016/0292791 | A1 | 10/2016 | Luessi | |
| 2019/0155969 | A1 * | 5/2019 | Haaland | G06N 3/09 |
| 2019/0258687 | A1 | 8/2019 | Spangenberg | |
| 2019/0294990 | A1 * | 9/2019 | Lopez De Prado | G06N 20/00 |
| 2021/0279564 | A1 | 9/2021 | Antic | |
| 2023/0316082 | A1 * | 10/2023 | Mishra | G06N 3/09 |
| 2023/0376356 | A1 | 11/2023 | Mahadik | |

OTHER PUBLICATIONS

Small, Michael, et al., "Detecting Determinism in Time Series: The Method of Surrogate Data", IEEE Transactions on Circuits and Systems I: Fundamental Theory and Applications, vol. 50, Issue 5, May 2003, pp. 663-672.*

"Web crawler", Wikipedia, downloaded from: https://en.wikipedia. org/wiki/Web_crawler, Sep. 6, 2025, pp. 1-16.*
Gralla, Preston, et al., "Part 9: How Search Engines Work", How the Internet Works, Special Edition, Ziff-Davis Press, Emeryville, CA, © 1997 by Macmillan Computer Publishing, 4 pages.*
"Statistical Model", Wikipedia, downloaded from: https://en.wikipedia. org/wiki/Statistical_model, Nov. 27, 2025, pp. 1-6.*
Felix Halim, Stratos Idreos, Panagiotis Karras, and Roland H. C. Yap. 2012. Stochastic database cracking: towards robust adaptive indexing in main-memory column-stores. Proc. VLDB Endow. 5, 6 (Feb. 2012), https://doi.org/10.14778/2168651.2168652, Abstract, 5 pages.
N Gulpinar, B Rustem, R Settergren, Simulation and optimization approaches to scenario tree generation, Journal of Economic Dynamics & Control, vol. 28, 2004, 9 pages.
LexisNexis. (Jan. 4, 2023). Navigate the World of Standard Essential Patents and Standards' Contributions, 1 page.
Kim, Sunhye & Yoon, Byungun. (Feb. 2021). Patent infringement analysis using a text mining technique based on SAO structure. Computers in Industry. 125. 103379. 10.1016/j.compind.2020. 103379, 6 pages.
Thiago Lima Prado et al. 2022 New J. Phys. 24 033027 "A direct method to detect deterministic and stochastic properties of data"; https://doi.org/10.1088/1367-2630/ac5057, 20 pages.
Yewei Song et al. 2019 J. Phys.: Conf. Ser. 1345 022023; "Evaluation of a Patent value based on AHP fuzzy comprehensive evaluation method"; https://doi.org/10.1088/1742-6596/1345/2/022023, 11 pages.

* cited by examiner

800

900

905
Receiving Raw Data comprising at least Two Datasets

910
Generating One or More Associations as a function of Classification

915
Reorganizing the Raw Data as a function of the One or More Associations

920
Storing the Reorganized Raw Data in an Index Structure by implementing an Indexing System as a function of the One or More Associations

APPARATUS AND A METHOD FOR HEURISTIC RE-INDEXING OF STOCHASTIC DATA TO OPTIMIZE DATA STORAGE AND RETRIEVAL EFFICIENCY

CROSS-REFERENCE TO RELATED APPLICATIONS

This application is a continuation of U.S. Non-provisional application Ser. No. 18/611,982, filed on Mar. 21, 2024, and entitled "APPARATUS AND A METHOD FOR HEURIS-TIC RE-INDEXING OF STOCHASTIC DATA TO OPTI-MIZE DATA STORAGE AND RETRIEVAL EFFI-CIENCY," the entirety of which is incorporated herein by reference.

FIELD OF THE INVENTION

The present invention generally relates to the field of data management system. In particular, the present invention is directed to an apparatus and a method for heuristic re-indexing of stochastic data to optimize data storage and retrieval efficiency.

BACKGROUND

In large-scale databases and information systems, efficient storage and retrieval of data are paramount. Existing solutions often struggle with the complexities presented by vast and varied datasets, particularly when dealing with stochas-tic data elements. Such elements are increasingly prevalent in fields e.g., machine learning and predictive analytics where data is not strictly deterministic. There is a need for a solution that can effectively manage both deterministic and stochastic data elements, integrating them in a manner that enhances data retrieval efficiency and accuracy.

SUMMARY OF THE DISCLOSURE

In an aspect, an apparatus for heuristic re-indexing of stochastic data to optimize data storage and retrieval effi-ciency. The apparatus includes at least a processor and a memory communicatively connected to the at least a pro-cessor. The memory instructs processor to receive raw data, wherein the raw data comprises at least two datasets. The at least two datasets include a first dataset having a plurality of deterministic data and a second dataset having a plurality of stochastic data. The memory instructs the processor to generate one or more associations as a function of a statis-tical model. The memory instructs the processor to reorga-nize the raw data as a function of the one or more associa-tions. The memory instructs the processor to store the reorganized raw data in an index structure by implementing an indexing system as a function of the one or more associations, wherein the indexing system is further config-ured to dynamically adjust the index structure in response to additional raw data.

Exemplary embodiments illustrating aspects of the pres-ent disclosure are described below in the context of several specific examples.

In another aspect, a method for the heuristic re-indexing of stochastic data to optimize data storage and retrieval efficiency is disclosed. The method includes receiving, using at least a processor, raw data, wherein the raw data com-prises at least two datasets. The at least two datasets include a first dataset having a plurality of deterministic data and a second dataset having a plurality of stochastic data. The method includes generating, using the at least a processor, one or more associations as a function of a statistical model. The method includes reorganizing, using the at least a processor, the raw data as a function of the one or more associations. The method includes storing the reorganized raw data in an index structure by implementing an indexing system as a function of the one or more associations, wherein the indexing system is further configured to dynamically adjust the index structure in response to addi-tional raw data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumen-talities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for heuristic re-indexing of stochastic data to optimize data storage and retrieval efficiency. The apparatus includes at least a pro-cessor and a memory communicatively connected to the at least a processor. The memory instructs processor to receive raw data, wherein the raw data comprises at least two datasets. The at least two datasets include a first dataset having a plurality of deterministic data and a second dataset having a plurality of stochastic data. The memory instructs the processor to generate one or more associations as a function of a classification of the plurality of stochastic data within the second dataset to the plurality of deterministic data within the first dataset. The memory instructs the processor to reorganize the raw data as a function of the one or more associations. The memory instructs the processor to store the reorganized raw data in an index structure by implementing an indexing system as a function of the one or more associations, wherein the indexing system is further configured to dynamically adjust the index structure in response to additional raw data. Exemplary embodiments illustrating aspects of the present disclosure are described below in the context of several specific examples.

Figure 1:
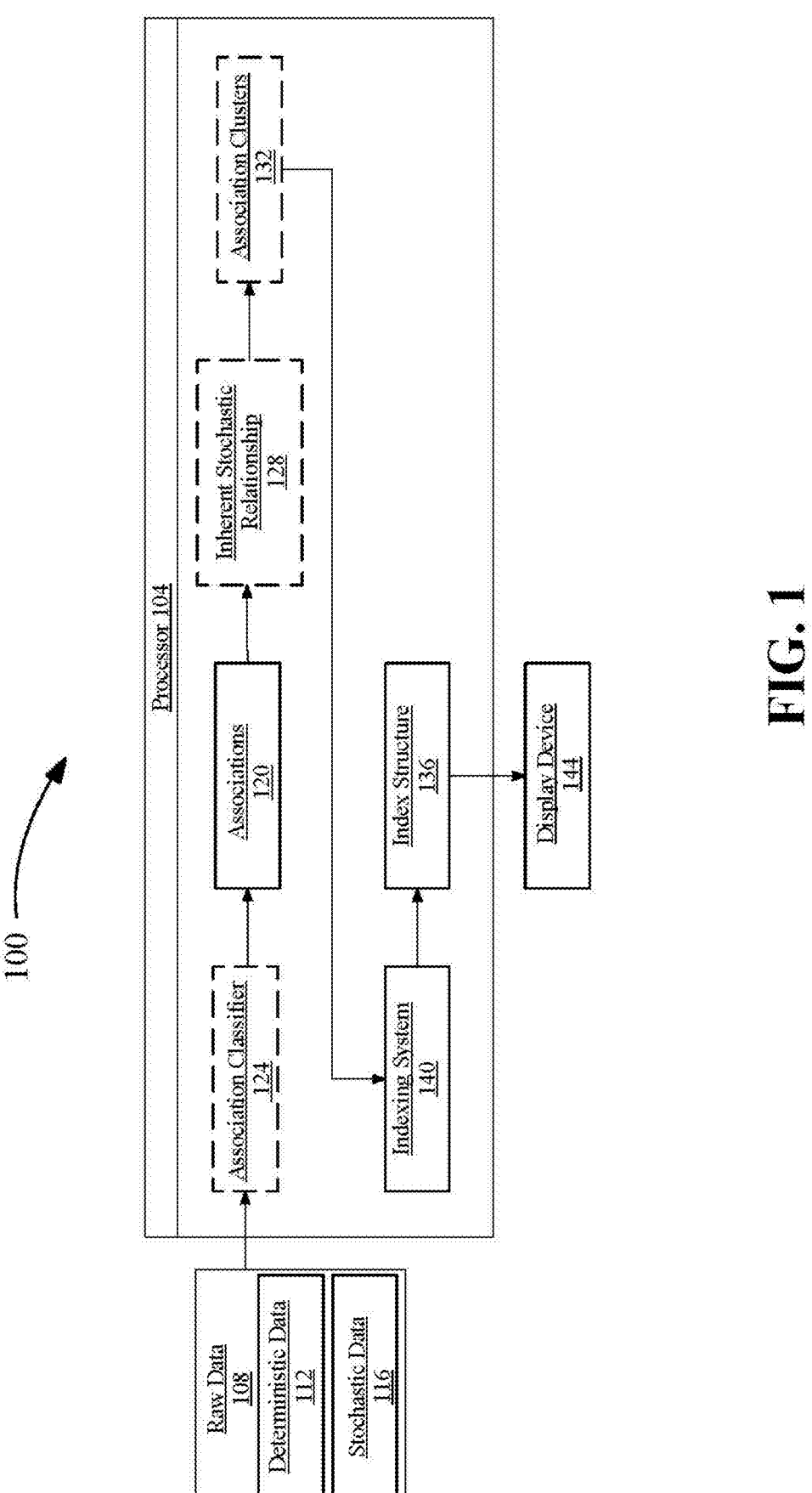
FIG. 1 is a block diagram of an exemplary embodiment of an apparatus for heuristic re-indexing of stochastic data to optimize data storage and retrieval efficiency.

Referring now to FIG. 1, an exemplary embodiment of an apparatus 100 for heuristic re-indexing of stochastic data to optimize data storage and retrieval efficiency is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive raw data 108. As used in the current disclosure, "raw data" is unorganized information that is collected directly from a source without having undergone any data processing, cleaning, or transformation. In some cases, raw data 108 may be generated through various scientific, technical, experimental, and/or business processes. This data may be essentially the initial output of experiments, observations, or measurements, before any analysis, interpretation, or transformation has occurred. Raw data 108 may take the form of numbers, text, images, files, digital media, video, documents, reports, records, spreadsheets, multimedia files, and the like. Raw data 108 may lack any meaningful context or structure. This data can be generated from diverse origins, such as sensors, user inputs, chatbots, APIs, tracking cookies, smart surveys, transactions, or manual observations. Raw data 108 may be stored in various formats, including spreadsheets, databases, log files, or even handwritten notes. In a non-limiting example, raw data 108 may be the sales information of an entity. This may include information associated with profits, inventory, revenue, employee productivity, timecards, and the like. In another non-limiting example, raw data 108 may include data generated by activity on a website. This might include the pages viewed, the duration of each visit, the IP address of the visitor, and the type of device used. In an additional example, in scientific experiments or environmental monitoring, sensors may be used to data about physical phenomena. The data gathered by these sensors may include raw data 108. In an embodiment, raw data may include a plurality of datasets. As used in the current disclosure, a "dataset" is a structured collection of data. Datasets may be organized and stored in a specific format, making it easy to access, manage, and analyze. For example, a dataset may be organized in a tabular format. Datasets may include a set of related data points or observations, each with attributes or variables that describe various characteristics or properties of the data. Datasets may be used in various fields, including statistics, machine learning, data analysis, and research, to study and extract insights from the information they contain.

With continued reference to FIG. 1, raw data 108 may include a plurality of data related to an entity. As used in the current disclosure, an "entity" is an organization comprised of one or more persons with a specific purpose. An entity may include a corporation, organization, business, group, and the like. The raw data 108 may include information regarding the entity's revenue, gross income, net income, business debts, a list of business expenses, current inventory, inventory history, sales information, human resource information, employee information, employee salaries, timecards, company assets, capital projects, accounting information, and the like. Raw data 108 may include information regarding the day-to-day activities of an entity. Raw data 108 may include information about administrative tasks, operations and production, communications and collaborations, sales and marketing, financial management, customer service, human resources, information technology, research and development, and the like.

With continued reference to FIG. 1, raw data 108 may include information related to one or more targets of the entity. Raw data 108 can encompass information that is directly or indirectly associated with one or more goals or objectives that an entity wishes to accomplish. These goals or objectives may be referred to as targets. As used in the current disclosure, a "target" is a task or an accomplishment that the entity would like to achieve. Raw data 108 related to these targets can be unprocessed, unorganized, and unstructured information collected from various sources. Raw data 108 related to targets may come in various forms, including numbers, text, multimedia, or other data types. The raw data 108 may be directly relevant to the targets that the entity is striving to achieve. It may include data points, measurements, or metrics that are used to assess progress or success in reaching these targets. Raw data 108 related to targets may serve as the starting point for data analysis and decision-making. In an embodiment, examples of raw data related to targets might include sales transaction records for a company aiming to achieve a revenue target, survey responses from customers indicating their satisfaction level, related to a customer satisfaction goal, academic performance data for a school or educational institution focused on improving student achievement, website analytics data for an online retailer striving to increase website traffic and conversion rates as targets and the like.

With continued reference to FIG. 1, raw data 108 includes a first dataset comprises a plurality of deterministic data 112. As used in current disclosure, "deterministic data" refers to consistent and predictable information or values related to a target. Deterministic data 112 related to a target may refer to information or values that are relatively predictable and have a high level of certainty in their connection to a specific goal or objective, commonly known as the target. In the context of pursuing a particular task or accomplishment, deterministic data 112 may be a known value that is related to the goal. Deterministic data 112 may be characterized by its reliability and precision, making it a valuable resource for assessing progress and making informed decisions as it relates to the target. Deterministic data 112 may be associated with a target in a way that leaves little to no room for ambiguity or randomness. For example, deterministic data 112 may include information related to the sales history of an entity. In another non-limiting example, deterministic data 112 may include information such as an entity has 110+ active clients. This may also include information such as 30% of the company's revenue comes from 3 active clients. In another non-limiting example, deterministic data 112 may include information regarding a valuation of inventory and other assets of the company. Deterministic data 112 may directly pertain to the specific goal or task at hand, offering insights and metrics that are known to be important for evaluating progress and creating a roadmap toward achieving the target. Deterministic data 112 includes a plurality of quantitative measurements, making it ideal for tracking, assessing, and planning the entities performance related to the target. Deterministic data 112 may have a causal relationship with the target of the entity. This cause-and-effect relationship between the deterministic data and the target may allow the processor 104 to identify new targets, sub-targets, progress towards targets, and the like. Additionally, this cause-and-effect relationship may allow the processor 104 to monitor changes in the data that can be directly attributed to progress or changes in the pursuit of the target. In an additional non-limiting example, deterministic data 112 may include time-elapsed measurements for a project with a fixed completion date or budget. The time/resources taken can be precisely compared to the target date/resource consumption to assess progress. In an addition non-limiting example, deterministic data 112 may include information related to the production output of an entity striving to reach a production quota. The data may quantify progress toward the production target.

With continued reference to FIG. 1, raw data 108 includes a second dataset comprises a plurality of stochastic data 116. As used in the current disclosure, "stochastic data" refers to information or values that involve an element of randomness, unpredictability, or uncertainty. This may include uncertainty in their connection to a specific target. In the context of pursuing a particular task or accomplishment, stochastic data may include information about factors or unknowns that can act as obstacles, introduce variability, or influence the outcome related to the target. This data may be characterized by its inherent unpredictability and probabilistic nature, making it crucial to consider when planning and evaluating progress toward the target. For example, stochastic data 116 may include data related to market trends, customer behaviors, market predictions, and the like. Stochastic data 116 may introduce uncertainty and variability into the relationship between the raw data 108 and the target. Stochastic data 116 may acknowledge that external factors or variables can impact the achievement of the goal. In some cases, stochastic data 116 may include an identification of these factors and variables. For example, and without limitation, stochastic data 116 may include information about market volatility and economic factors affecting a company's revenue target. These external factors introduce uncertainty and variability into revenue projections. Stochastic data 116 may be described using probability distributions or statistical models (e.g., Poisson Distribution, Linear Regression Models, Logistic Regression Models, and the like), reflecting the likelihood of various outcomes or obstacles affecting the target. Stochastic data 116 may include information about potential obstacles, risks, or external factors that can hinder or facilitate progress toward the target. Stochastic data 116 may include a range of possible outcomes, each with a certain probability of occurrence. It is not limited to a single deterministic value. In a non-limiting example, stochastic data 116 may include information related to supply chain disruptions impacting a company's production target. Unforeseen events can affect the ability to meet production quotas. In an additional non-limiting example, stochastic data 116 may include information related to personnel issues within an organization. This might include variables such as employee turnover, unexpected absences, or changes in workforce productivity. These factors introduce uncertainty into achieving specific workforce-related targets or accomplishments. In an additional non-limiting example, stochastic data 116 may include information related to regulatory changes or legal developments. These factors can influence the ability to achieve specific compliance or regulatory targets, and they are often subject to external influences and uncertainties.

With continued reference to FIG. 1, raw data 108 may be generated using tracking cookies. As used in the current disclosure, a "tracking cookie" is a type of web cookie (i.e., a small piece of data) that a website sends to a web browser when accessed by the entity. These cookies are typically stored on the user's device, such as a computer or smartphone, and they serve various purposes, including tracking and collecting information about the user's online behavior. In some embodiments, tracking cookies may be used to generate the digital footprint of the consumer. The digital footprint of a consumer or entity may then be used to generate raw data 108. Cookies may include small text files that websites and online services can place on a user's device to track their online activity. Cookies may work by sending a small amount of data from a website to a user's browser, which is then stored on the user's device. When the user visits the same website again, the browser sends the cookie data back to the website, allowing the website to remember the user's preferences and settings. There are two main types of cookies: session cookies and persistent cookies. Session cookies are temporary cookies that are deleted when the user closes their browser. Persistent cookies, on the other hand, remain on the user's device even after the browser is closed and can be used to remember the user's preferences for future visits to the website. While cookies can be useful for providing personalized experiences and improving website performance, they can also be used to track a user's digital footprint. In a non-limiting example, processor 104 may employ a plurality of tracking cookies to track a user's online activity. This may allow processor 104 to build a detailed version of raw data 108.

With continued reference to FIG. 1, raw data 108 may be generated using a web crawler. A "web crawler," as used herein, is a program that systematically browses the internet for the purpose of web indexing. The web crawler may be seeded with platform URLs, wherein the crawler may then visit the next related URL, retrieve the content, index the content, and/or measure the relevance of the content to the topic of interest. In some embodiments, processor 104 may generate a web crawler to compile the raw data 108. The web crawler may be seeded and/or trained with a reputable website, such as the user's business website, to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract entity records, inventory records, financial records, human resource records, sales records, user notes, and observations, based on criteria such as a time, location, and the like. In some cases, a web crawler may be seeded with the URL to the entity's website or internal systems. The process of seeding a web crawler refers to the process of providing an initial set of URLs or starting points from which, the crawler begins its exploration of the web. These initial URLs are often called seed URLs or a seed set. Seeding may be a curtail step in the web crawling process as it defines the starting point for discovering and indexing web pages.

With continued reference to FIG. 1, raw data 108 may be received from a user and/or a third party using a chatbot. A chatbot can be used to receive inputs from a user to generate raw data 108, wherein a chatbot input is discussed in greater detail herein below. Raw data 108 that is received from a chatbot may include one or more user inputs. User inputs may include text, images, videos, locations, timestamps, user feedback, multimodal data, and the like. In some cases, processor 104 may harvest metadata from a user's interaction with a chatbot and compile raw data 108 based on the harvested metadata. This may include information about a session duration, timestamps, interaction logs, IP addresses, browser information, device information, and the like. The chatbot may be configured to ask a user a plurality of inquiries related to one or more aspects of their targets to identify both deterministic data 112 and stochastic data 116. The chatbot may use natural language processing techniques to understand and extract key information from the user's responses. This may help in determining the specific attributes or characteristics of the raw data 108 related to the entity. Based on the collected data and user inputs, the chatbot may generate raw data 108. Processor 104 may organize the information into different sections or categories based on the nature of the entity. This may be done using a chatbot as described herein below in FIG. 7.

With continued reference to FIG. 1, raw data 108 may be generated from one or more entity records. As used in the current disclosure, an "entity record" is a document that contains information regarding the entity. Entity records may include employee credentials, reports, financial records, medical records, business records, asset inventory, sales history, sales predictions, government records (i.e., birth certificates, social security cards, and the like), and the like. An entity record may additionally include operating records of the entity. Operating records may include things like data associated with the sales of goods and services by the entity. This may include things bills of sale, consumer records, sales projections, and the like. Entity records may be identified using a web crawler. Entity records may include a variety of types of "notes" entered over time by the entity, employees of the entity, support staff, advisors, consultants, tax professionals, financial professionals, and the like. Entity records may be converted into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors' algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 is configured to generate one or more associations 120 as a function of a classification of the stochastic data 116 within the second dataset to the deterministic data 112 within the first dataset. As used in the current disclosure, an "association" refers to a relationship or connection that exists between two types of data within a dataset or analytical context. Associations between the stochastic data 116 and the deterministic data 112 may involve linking or combining information that exhibits randomness and uncertainty (stochastic data) with information that is entirely predictable and certain (deterministic data). The associations 120 created between the stochastic data 116 and the deterministic data 112 may involve a connection or relationship established during data analysis or modeling. Associating stochastic data 116 with the deterministic data 112 may include determining if there are any common key variables or factors that can be used to link the two datasets. In some cases, a first dataset may contain information or values that are considered deterministic, meaning they are predictable and lack randomness or uncertainty. These data points may be directly associated with specific targets or goals. Whereas the second dataset may include stochastic data 116 related to obstacles and uncertainties that may affect the same or similar targets as those in the first dataset. Stochastic data 116 may include information about factors, risks, or unknowns that introduce variability, unpredictability, and uncertainty into the pursuit of these targets. Creating associations 120 between each of the datasets may include identifying commonalities between the datasets. This may include determining which targets in the first dataset (deterministic data 112) correspond or relate to the obstacles to the targets in the second dataset (stochastic data 116). Both datasets should have shared objectives or accomplishments they aim to measure or achieve. To gain a comprehensive understanding of the target and its associated challenges, processor 104 may integrate the stochastic data from the second dataset with the deterministic data from the first dataset. This integration may involve statistical modeling, data analysis techniques, or visualization methods to connect how the stochastic factors impact the deterministic measurements. For example, an association 120 may include analyzing how market volatility (stochastic data) affects sales figures (deterministic data) to assess the overall risk to revenue targets.

With continued reference to FIG. 1, processor 104 may be configured to create one or more associations 120 between the stochastic data 116 and the deterministic data 112. Creating associations between the stochastic data 116 and the deterministic data 112 may include identifying and understanding the relationship between the influence of stochastic factors (from Stochastic Data 116) on the target or goal that is governed by deterministic data (from Deterministic Data 112). In an embodiment, creating these associations 120 may include analyzing how uncertainties, variability, or potential obstacles represented by the stochastic data 116 may affect the deterministic data or the achievement of the target. This may include identifying patterns, correlations, or cause-and-effect relationships between the stochastic data 116 and the deterministic data 112. In some cases, processor 104 may generate these associations 120 by combining or linking the two datasets based on a common identifier or key variable that connects the deterministic and stochastic data to the same target. Once these datasets are linked processor 104 may explore the combined dataset to gain a comprehensive view of how deterministic data 112 and stochastic data 116 are related to a target. This may include the identification or creation of potential relationships or patterns between deterministic and stochastic variables that may impact the target. This may be done by conducting statistical analyses to assess the influence of stochastic data on the target. This may involve techniques such as regression analysis, correlation analysis, or hypothesis testing.

With continued reference to FIG. 1, in some cases, one or more associations 120 may include an inherent stochastic relationship 128. In one or more embodiments, processor 104 may be configured to identify at least an inherent stochastic relationship 128 within the at least two datasets as a function of the one or more associations 120. As used in the current disclosure, an "inherent stochastic relationship" refers to a probabilistic or uncertain connection within the relationship between the first dataset and the second dataset. This relationship may include intrinsic uncertainty and unpredictability that may be involved in achieving a specific goal or target when external factors and obstacles are at play. This relationship may also be characterized by its inherent unpredictability and the acknowledgment that randomness or uncertainty plays a role in how the stochastic data and deterministic data are related. In some cases, the relationship may be centered around a specific target, goal, or objective of an entity. The deterministic data 112 may encompass known factors, variables, or conditions that influence the likelihood of achieving the target. Stochastic data 116 may include information about uncertainties, obstacles, or problems that can hinder progress toward the target. These obstacles introduce variability and randomness into the pursuit of the goal. In an embodiment, the relationship may be inherently probabilistic, acknowledging that achieving a target is subject to uncertainties and random fluctuations due to the presence of stochastic obstacles. Determining an inherent stochastic relationship 128 may include identifying the interplay between deterministic and stochastic factors. The deterministic data and stochastic data interact to determine information that is related to the target. Additionally, determining an inherent stochastic relationship 128 may include identifying how the known deterministic factors influence the stochastic factors. In an embodiment, the processor may identify an inherent stochastic relationship 128 by evaluating how changes or patterns in deterministic data 112 are related to variations in stochastic data 116, looking for evidence of dependency or influence. This may involve calculating the likelihood or probability distributions of various outcomes, taking into account the uncertainty inherent in the stochastic elements. The processor 104 might also perform simulations or use predictive modeling to test and validate the identified relationships. Through this process, the processor may delineate the inherent stochastic relationship, quantifying the extent to which the predictable elements (deterministic data) are associated with or influenced by the unpredictable factors (stochastic data), thereby enabling more informed decision-making and predictive insights.

With continued reference to FIG. 1, processor 104 may generate an association score as a function of the one or more associations 120. As used in the current disclosure, an "association score" is a quantitative measure that evaluates the strength, significance, or relevance of the relationships identified between different data elements or variables. This score may be derived from analyzing the patterns, correlations, or connections that exist between two or more datasets (i.e. deterministic data 112 of a first dataset and stochastic data 116 of a second dataset). These associations could be between different variables, data points, or sets of items. The nature of these associations may vary. The associations might represent correlations, causal relationships, similarities, or other types of connections. In an embodiment, an association score may quantify how the strength of the association 120 between the deterministic data 112 and stochastic data 116 are related. A higher score usually may indicate a stronger relationship. For example, a high score may indicate the relevance or impact that elements of stochastic data 116 have on the deterministic data 112. In another example, a high score may suggest that changes in deterministic data 112 may have a more predictable impact on the stochastic data, or vice versa. An association score may also reflect the statistical significance of the association. This may involve determining whether the observed relationship is likely due to chance or is statistically meaningful. In an embodiment, P-values or confidence intervals may be used in conjunction with the association score to assess significance. In an embodiment, an association score may indicate how meaningful or useful the association is in each context. In a non-limiting example, in a business setting, a relevant association would be one that has practical implications for decision-making or strategy formulation. The association score may be normalized or standardized to ensure comparability across different datasets or variables. This means that the score is often scaled to fall within a specific range (i.e. 0 to 1 or −1 to 1). Normalization techniques can include min-max scaling, z-score normalization, or logarithmic transformation. In an embodiment, an association score may be expressed as a numerical score, a linguistic value, or an alphabetical score. A non-limiting example, of a numerical score, may include a scale from 1-10, 1-100, 1-1000, and the like. In another non-limiting example, linguistic values may include, "Strong Association," "Moderately Significant Association," "Irrelevant Association," and the like. In some embodiments, linguistic values may correspond to a linguistic variable score range. For example, a user that receives a score between 40-60, on a scale from 1-100, may be considered a "Moderately Significant Association Consumer."

With continued reference to FIG. 1, processor 104 may employ a series of statistical methods and algorithms designed to measure the extent and nature of the relationship between these two types of data. The processor 104 may employ statistical techniques such as correlation analysis, regression models, or advanced machine learning algorithms to quantify the relationship between the datasets. For instance, it might use a Pearson correlation coefficient if both datasets are continuous and linearly related, or Spearman's rank correlation for non-parametric data. In more complex scenarios, machine learning models like random forests or neural networks can discern non-linear and intricate patterns between the datasets. The processor 104 may compute the degree of association, and accounts for the variability and uncertainty inherent in the stochastic data. Alternatively, the score might be reflected as a p-value or a confidence interval, particularly in regression analysis, providing a measure of statistical significance. The score is a concise, quantifiable representation of the relationship's strength, direction, and statistical reliability, allowing users to gauge how significantly the deterministic factors are associated with the stochastic outcomes.

With continued reference to FIG. 1, an association score may be reflected using a P-value. The p-value may quantify the strength of evidence for or against a particular hypothesis regarding this association 120. Processor 104 may be configured to formulate a hypothesis based on the potential association 120 between the stochastic data 116 and deterministic data 112. As used in the current disclosure, a "hypothesis" a proposed explanation or prediction that posits a specific relationship or pattern among these variables. This hypothesis may be formulated after preliminary data analysis or observation, where associations between different variables have been identified and suggest a potential causal or correlational link. The hypothesis may posit that there is either a significant relationship or effect between the two datasets or no significant relationship or effect between the stochastic data and the deterministic data. Processor 104 may employ one or more statistical tests to assess the association 120. The choice of the specific test depends on the nature of the data and the research question. For example, regression analysis or correlation analysis may be used. Processor 104 may then calculate a test statistic based on the data and the chosen statistical test. It may measure how much the observed association 120 deviates from what would be expected under the hypothesis. Processor 104 may then calculate a p-value based on the test statistic and the hypothesis. It may quantify the probability of obtaining the observed association 120 or a more extreme association if the hypothesis were true. In some embodiments, if the p-value is less than the chosen significance level (I.e., $\alpha \geq 0.05$), it may be considered statistically significant. This suggests that the evidence is strong against the hypothesis, indicating a high likelihood significant association 120 between the stochastic and deterministic data. In some embodiments, if the p-value is significant (i.e., less than $\alpha$), researchers or analysts may reject the null hypothesis in favor of the alternative hypothesis. This implies that there is a meaningful association 120 between the stochastic and deterministic data. The significance of the association 120 can have practical implications for decision-making. For instance, if the p-value is significant, it may suggest that certain stochastic factors significantly impact the deterministic data (e.g., obstacles affect the target's achievement). Processor 104 may use p-values to describe associations 120 between stochastic and deterministic data involves testing whether the observed relationship between the datasets is statistically significant or if it could have occurred by chance alone. A low p-value may suggest a strong association, while a high p-value indicates a weaker or non-significant association. This statistical approach helps in quantifying the strength of the relationship and informs decision-making regarding the impact of stochastic factors on deterministic outcomes.

With continued reference to FIG. 1, processor 104 may associate the plurality of stochastic data within the second dataset with the plurality of deterministic data within the first dataset using an association classifier 124. As used in the current disclosure, a "association classifier" is a classifier that is configured to generate one or more associations 120 between the first dataset and the second dataset. An association classifier 124 may be consistent with the classifier described below in FIG. 2. Inputs to the association classifier 124 may include raw data 108, a first dataset, second dataset, stochastic data 116, deterministic data 112, examples of inherent stochastic relationship 128, examples of one or more associations 120, and the like. Outputs to the association classifier 124 may include one or more associations 120 between the first dataset and the second dataset. In another embodiment, outputs to the association classifier 124 may include inherent stochastic relationship 128 tailored to the one or more associations 120 and raw data 108. In an embodiment, the association classifier 120 may be configured to operate in tandem or employ a statical model. For example, the association classifier 124 may be configured to conduct hypothesis tests to assess the significance of the relationships within the model, the hypothesis is discussed in greater detail herein above. This may be done to prove or disprove a hypothesis that is presented to the statical model. In some embodiments, the association classifier 124 may be configured to generate one or more hypotheses that are associated with a potential inherent stochastic relationship 128. Association training data may include a plurality of data entries containing a plurality of inputs that are correlated to a plurality of outputs for training a processor by a machine-learning process. In an embodiment, association training data may include a plurality of stochastic data 116 and deterministic data 112 as inputs correlated to examples of one or more associations 120 as outputs. Association training data may be received from database 300 as described in further detail below. Association training data may contain information about a first dataset, a second dataset, stochastic data 116, deterministic data 112, examples of inherent stochastic relationship 128, examples of one or more associations 120, and the like. In an embodiment, association training data may be iteratively updated as a function of the input and output results of past association classifiers 124 or any other classifier/machine learning model mentioned throughout this disclosure. The classifier may use, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifier, and the like.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, machine-learning models and/or classifiers may be trained using past inputs and outputs of an association classifier 124. In some embodiments, if user feedback indicates that an output of machine-learning models and/or classifiers was "bad," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for the machine-learning model and/or classifier using user feedback. For the purposes of this disclosure, "accuracy score," is a numerical value concerning the accuracy of a machine-learning model. For example, the accuracy/quality of the outputted association classifier 124 may be averaged to determine an accuracy score. In some embodiments, an accuracy score may be determined for the quality of the one or more associations 120 between the first dataset and the second dataset. Accuracy score may indicate a degree of retraining needed for a machine-learning model and/or classifier. Processor 104 may perform a larger number of retraining cycles for a higher number (or lower number, depending on a numerical interpretation used), and/or may collect more training data for such retraining. The discussion within this paragraph and the paragraphs preceding this paragraph may apply to both the association classifier 124 and/or any other machine-learning model/classifier mentioned herein.

With continued reference to FIG. 1, processor 104 may identify the one or more associations 120 using a statical model. In an embodiment, a statistical model may be employed to quantify the influence of stochastic obstacles on the deterministic factors associated with the target. As used in the current disclosure, a "statical model" is a mathematical representation or framework that is used to describe and analyze relationships within a dataset or to make predictions based on observed data. These models may provide a structured way to understand and quantify the patterns, dependencies, and variability in a dataset. This may be done using a plurality of probability distributions and simulations to assess the range of possible outcomes. Processor 104 may define the specific hypothesis for the model to investigate. For example, does a given stochastic factor have significant impact on a known deterministic factor. In another example, how do stochastic obstacles impact the likelihood of achieving the target. Based on a given hypothesis processor 104 may then select a given statical model that will provide the desired result. Examples of statistical models may include but are not limited to regression models, time series analysis, Bayesian models, and the like. The processor 104 may define the variables and relationships within the statistical model. In this case, the processor may specify how the stochastic data and deterministic data interact within the model to represent the hypothesized inherent stochastic relationship 128 and/or one or more associations 120. Processor 104 may employ model estimation to determine the parameters of the model. The software may fit the model to the raw data 108 and its associations 120, providing estimates of coefficients, variances, and other relevant parameters. The statical model may then conduct hypothesis tests to assess the significance of the relationships within the model. For instance, processor 104 may test whether the coefficients associated with stochastic obstacles are statistically significant in influencing the deterministic factors related to the target. Processor 104 may then interpret the results of the statistical model. This may be done to determine how the stochastic data and deterministic data interact within the model and whether the inherent stochastic relationship 128 is supported by the analysis. Processor 104 may additionally utilize the statistical model to quantify the uncertainty and variability associated with the inherent stochastic relationship 128. For example, processor 104 may use confidence intervals or predictive intervals to express the range of possible outcomes. In some cases, processor 104 may create visualizations, such as scatter plots, regression plots, time series plots, and the like to help visualize the relationship between stochastic and deterministic factors.

With continued reference to FIG. 1, processor 104 may reorganize the raw data 108 as a function of the one or more associations 120. Reorganizing the raw data as a function of one or more associations 120 may involve restructuring and manipulating the data to highlight or emphasize the relationships and patterns identified through those associations. Processor 104 may reorganize the data by identifying at least one association 120 or inherent stochastic relationship 128 that is relevant to a current inquiry to apparatus 100. The inquiry may include questions related to an entities progress towards their given targets. This may include an identification of the stochastic factors that are hindering a specific deterministic factor. This may additionally include a question of the degree to which a stochastic factor presents an obstacle to a deterministic factor. In some cases, a reorganization of the raw data 108 may include an identification of one or more variables that are involved with the identified associations 120. These may include dependent variables, independent variables, and any other related attributes or factors. If necessary, processor 104 may identify new variables or derived variables that represent the associations more directly. This may involve calculating ratios, aggregating data, or categorizing variables to simplify the analysis. Depending on the nature of the associations 120, it may be advantageous to reorganize the data tables. This could involve creating new datasets or modifying existing ones to focus on the selected associations 120. In an embodiment, processor 104 may apply one or more data transformation techniques if they enhance the clarity of the associations. Common transformations include logarithmic transformations, standardization, or normalization. In another embodiment, reorganizing the raw data 108 may include filtering or sub-setting the data to focus on specific subsets or segments that are particularly relevant to the associations 120 of interest. This can help in isolating specific patterns or trends. Reorganizing raw data 108 based on associations may help streamline the data analysis process, making it easier to explore, communicate, and act upon the insights derived from the data. It is a crucial step in turning raw data into actionable knowledge.

With continued reference to FIG. 1, processor 104 may be configured to identify one or more association clusters 132 as a function of one or more associations 120. As used herein, an "association cluster" is a collection of data points that reflect an association 120 between deterministic data 112 and stochastic data 116. In some embodiments, an association cluster 132 may reflect an inherent stochastic relationship 128. An association cluster 132 may include a grouping of data points that represents a collection of similar or related data points within one or more datasets. In other words, a cluster may be a subset of data points that exhibit some degree of similarity or proximity to each other, while being distinct from other clusters in the dataset. Identification of clusters may be used to uncover patterns, structure, or relationships within a dataset, such as a first dataset and a second dataset. Association clusters 132 can be formed based on various criteria, such as proximity in the feature space or similarity in demand. In an embodiment, association clusters 132 may be generated based on the relevance of a one or more elements of stochastic data 116 to the goal or the deterministic data 112. This may include degree the stochastic data 116 possesses an obstacle to the targets of the deterministic data 112. By identifying association clusters 132, processor 104 may gain insights into the underlying structure of the data and potentially discover meaningful patterns or subgroups within raw data 108. In an embodiment, clusters may be generated as a function of the deterministic data 112 and stochastic data 116, respectively. In an embodiment, a cluster may include a graphical representation of one or more elements of raw data 108, deterministic data 112, stochastic data 116, one or more associations 120, inherent stochastic relationships 128, and like. This graphical representation may include one or more associations 120 and/or inherent stochastic relationships 128 plotted as a single point or a plurality of points. Processor 104 may identify one or more clusters based on their similarity or homogeneity as it relates to the group of data points. A cluster may represent groups of data points that share similar characteristics or properties. In some cases, a processor 104 may identify grouping and subgroupings based on the identification of one or more clusters. Clusters may indicate the existence of distinct subpopulations or classes within the dataset. Clusters can reveal patterns or structures in the data that are not immediately apparent. By examining the characteristics of data points within a cluster, we may uncover relationships or associations that can be useful for further analysis or decision-making.

With continued reference to FIG. 1, reorganizing the raw data 108 may include reorganizing the raw data 108 into one or more association clusters 132 using hierarchical clustering. As used in the current disclosure, "hierarchical clustering" is a method that arranges data points into a tree-like structure where clusters at various levels of granularity are formed. To generate hierarchical clustering processor 104 may choose one or more similarity or distance metrics to quantify the similarity between data points of raw data 108. Distance metrics may include Euclidean distance, Manhattan distance, or correlation coefficients. This metric may be crucial for hierarchical clustering to determine which data points are similar to each other. Processor 104 may apply one or more hierarchical clustering algorithms to the raw data 108. This may be done using an agglomerative approach (bottom-up) and/or a divisive approach (top-down). Agglomerative clustering may start with individual data points as separate clusters and progressively merges them into larger clusters, while divisive clustering may star with all data points in a single cluster and recursively divides them into smaller clusters. As the clustering algorithm is implemented it may construct a tree data structure. As used in the current disclosure, a "tree data structure" is a visual and analytical tool used to illustrate how individual elements in a dataset are grouped together based on their similarity. In this structure, each leaf (or node) may represent an individual data point of raw data 108. At some points on the tree, nodes may begin to merge, indicating the formation of clusters. These mergers may be based on a chosen similarity or distance metric, such as Euclidean distance for quantitative data or Jaccard similarity for categorical data. The height, on the data tree structure, at which two nodes merge may represent the distance or dissimilarity between them, with lower mergers indicating greater similarity. This hierarchical approach may allow for a visual representation of which elements are grouped together but also the hierarchy and multi-level relationships within the data.

With continued reference to FIG. 1, a tree data structure may include one or more balancing tree structures (i.e. B+Tree structures and B-Tree structures), B-trees may be referred to as self-balancing tree structures that adapt to insertions and deletions of data, making them well-suited for dynamic indexing scenarios. As new raw data 108 is added to the dataset or existing data is removed, the B-tree index may be updated accordingly. B-trees may be designed to handle insertions and deletions efficiently while maintaining balance, which ensures predictable and consistent search performance. B-trees may be configured to automatically balance themselves during insertions and deletions to maintain a relatively uniform tree structure. This self-balancing property may guarantee that the height of the tree remains logarithmic, optimizing search and retrieval operations. When a node in the B-tree becomes full due to insertions, it may split into two or more nodes, and the parent node is updated accordingly. Conversely, when a node becomes too sparse due to deletions, it may merge with a neighboring node to maintain balance. In an embodiment, a B-tree index may be configured to dynamically adapt to the changing dataset without requiring a complete rebuild of the index. This adaptability is particularly valuable in scenarios where data is frequently updated or appended.

With continued reference to FIG. 1, processor 104 may identify or more association clusters 132 using a cluster machine-learning model. As used in the current disclosure, a "cluster machine-learning model" is a machine-learning model that is configured to generate or more association clusters 132. A cluster machine-learning model may be consistent with the machine-learning model described below in FIG. 2. Inputs to the cluster machine-learning model may include raw data 108, a first dataset, second dataset, stochastic data 116, deterministic data 112, one or more associations 120, inherent stochastic relationship 128, examples of or more association clusters 132, and the like. Outputs to the cluster machine-learning model may include or more association clusters 132 tailored to the raw data 108 and one or more associations 120. Cluster training data may include a plurality of data entries containing a plurality of inputs that are correlated to a plurality of outputs for training a processor by a machine-learning process. In an embodiment, cluster training data may include a plurality of raw data 108 and one or more associations 120 correlated to examples of or more association clusters 132. Cluster training data may be received from database 300. cluster training data may contain information about raw data 108, a first dataset, second dataset, stochastic data 116, deterministic data 112, one or more associations 120, inherent stochastic relationship 128, examples of or more association clusters 132, and the like. In an embodiment, cluster training data may be iteratively updated as a function of the input and output results of past cluster machine-learning model or any other machine-learning model mentioned throughout this disclosure.

With continued reference to FIG. 1, processor 104 is configured to store the reorganized raw data in an index structure 136. As used in the current disclosure, an "index structure" is a data structure or mechanism used to optimize and accelerate the retrieval of specific information or records from a dataset. An index structure 136 may be used to store and organize data a plurality of data points associated with the raw data 108. An index structure 136 may organize data points of raw data 108 by creating a systematic and searchable framework that enhances the efficiency and speed of data retrieval. It functions similarly to an index in a book, allowing for rapid access to the desired information. When applied to raw data 108, the index structure 136 may categorize and sort data points based on key attributes or fields, such as timestamps, numerical values, or specific characteristics. This categorization typically involves mapping each data point to an index key, which is then stored in a structured format like a single column index, unique index, hash index, bitmap index, B-tree, hash table, and/or bitmap index. These structures may enable quick lookups, as they reduce the need to scan through the entire dataset to find a particular piece of information. Instead, the index directs the query to the precise location where the relevant data is stored. This organization is especially beneficial in large datasets, where it significantly cuts down on search time and improves overall data handling efficiency. In a non-limiting example, a B-tree index may organize data in a balanced tree structure, allowing for efficient retrieval, insertion, and deletion of data points. Alternatively, a hash table may use a hash function to map keys to specific positions in a table, facilitating rapid data access through direct indexing. Similarly, an inverted index may list all the occurrences of each word within a document or a set of documents, enabling quick full-text searches. By organizing data points in such structured ways, index structures significantly reduce the time complexity of search operations, making data retrieval in large databases and search engines both fast and efficient. By efficiently indexing raw data, the system ensures that even as the volume of data scales up, the time taken to access any specific piece of data remains relatively constant and manageable. An index structure 136 may establish a relationship between the indexed data and the associated records in the dataset. It maps key values or attributes to the corresponding data entries. This may include recording and/or highlighting one or more associations 120 and/or inherent stochastic relationships 128 between the first dataset and the second dataset. Index structures are typically built on one or more key values or attributes that are commonly used for searching, filtering, or sorting data. These key values serve as references to the actual data records. In an embodiment, an index structure 136 may be a database such as database 300.

With continued reference to FIG. 1, processor 104 is configured to store the reorganized raw data in an index structure 136 by implementing an indexing system 140. As used in the current disclosure, an "indexing system" is a structured and organized approach to categorizing, cataloging, and managing information or resources for efficient retrieval and reference. An indexing system 140 may be used to facilitate quick and effective access to specific items, documents, data, or resources within a larger collection. An indexing system 140 may be used to classify raw data 108 into one or more categories based on the specific criteria or attributes associated with the raw data 108. This may include organizing the raw data 108 into categories, topics, or classes to create a structured hierarchy. Indexing systems 140 may rely on key attributes, metadata, or descriptors associated with element of raw data 108 to facilitate the organization, refinement, and indexing of the raw data 108. These attributes may include titles, keywords, authors, dates, and other relevant information that help define and categorize the items. In an embodiment, an indexing system 140 may assign keywords or terms to items to represent their content or characteristics. These keywords serve as access points and enable users to search for and locate items based on specific terms. In a non-limiting example, one or more association clusters 132 may be labeled with one or more keywords to aid in the identification and interpretation of the association cluster 132. In an embodiment, an indexing system 140 may use a hierarchical structure, such as a taxonomy or tree-like classification, to arrange items into broader categories and subcategories. This structure may provide a systematic way to navigate the indexed content. This hierarchical structure may be used to store one or more hierarchical association clusters 132. For example, an indexing system 140 may be configured to index each association cluster 132 according to its position in the tree data structure.

With continued reference to FIG. 1, an indexing system 140 may be configured to organize data points of raw data 108 to reflect associations between deterministic and stochastic data. Indexing system 140 may operate by creating a structured framework that can effectively map the relationships and interactions between these two types of data. Initially, the indexing system may combine the deterministic and stochastic datasets. This may include preprocessing the raw data. This may involve cleaning the data, handling missing values, normalizing datasets, and possibly transforming data into a format suitable for analysis and indexing. Indexing system 140 may identify key attributes or features within both datasets that will be used for indexing. These key attributes may be the data points of raw data 108 used to identify the one or more associations 108. In the deterministic dataset, these might be specific variables or metrics, while in the stochastic dataset, these could be variables that show variability or change over time. The indexing system 140 may analyze the datasets to identify associations between the deterministic and stochastic data. This could involve statistical correlation analysis, regression models, or more complex data mining techniques like clustering algorithms or machine learning models, depending on the complexity and nature of the data. Once associations 120 are identified, the indexing system 140 may build an index structure 136 that maps these relationships. This structure could be a multidimensional index where one dimension represents deterministic data and another represents stochastic data, and the associations are reflected in the way the data points are arranged or linked within this space. The index structure 136 might use tree-based structures like B-trees or R-trees, especially if the data is multidimensional. In some cases, graph databases can be employed to represent complex relationships more flexibly. As new raw data 108 is ingested into the system, the indexing system 140 may dynamically update the index structure 136 to reflect new associations or changes in existing ones. This is crucial in maintaining the relevance and accuracy of the index, especially given the variable nature of stochastic data. The indexing system may allow for efficient query processing. Users can query the index to find data points or patterns that meet specific criteria, combining aspects of both deterministic and stochastic data.

With continued reference to FIG. 1, the indexing system 140 is configured to dynamically adjust the index structure in response to additional raw data 108. This may be done by implementing adaptive indexing strategies. This dynamic adjustment may be done to ensure that the index remains efficient and effective as the dataset grows and evolves. The indexing system 140 may be configured to continuously monitor the plurality of dataset for new raw data 108. This may include tracking changes in the dataset's characteristics, size, distribution, and the like. As new data points are added to the raw data 108, processor 104 may define thresholds or triggers that indicate when it is time to update the index structure. These thresholds can be based on factors like data volume, query performance, changes in data patterns, and the like. Processor 104 may additionally implement auto-scaling mechanisms that automatically adjust the index structure as needed. This may involve increasing the index size, adding new index entries, or reorganizing the index hierarchy. In an embodiment, if the dataset becomes too large to manage efficiently, the indexing system 140 may dynamically partition of the index structure 136. Partitioning the index structure 136 may include splitting the index structure 136 into smaller partitions or shards, each handling a subset of the data. This allows for parallel processing and faster query performance. In some cases, the indexing system 140 may be configured to analyze the distribution of data and adapt the index structure to optimize data retrieval. For example, if certain data values are heavily skewed, you may create specialized indexes or partitions for those values.

The dynamic adjustment of the index structure 136 may be implemented using adaptive indexing algorithms that can modify the index structure on-the-fly. Examples include self-balancing tree structures (e.g., B-trees), which adjust as new data is inserted or removed. Dynamic indexing of raw data 108 may involve the use of B-tree data structures to efficiently manage and search through a continually changing dataset.

Still referring to FIG. 1, processor 104 may be configured to display the index structure 136 using a display device 144. As used in the current disclosure, a "display device" is a device that is used to display a plurality of data and other digital content. Processor 104 may be configured to generate a display data structure, wherein the display data structure may be configured to cause a display device to display the target report or other data mentioned herein. A display device 144 may include a user interface. A "user interface," as used herein, is a means by which a user and a computer system interact, for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pulldown menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

With continued reference to FIG. 1, a display device 144 may be configured to display a visual representation of the association clusters 132 using a dendrogram. As used in the current disclosure, a "dendrogram" is a tree-like structure that illustrates the hierarchy of clusters. The dendrogram may show how data points are grouped into clusters at different levels of similarity. To identify association clusters 132, processor 104 may need to determine a threshold or level in the dendrogram where clusters are selected. Depending on the application processor 104 may choose to cut the dendrogram at a specific height or depth, resulting in clusters of varying sizes. In an embodiment, each identified association cluster 132 may represent a collection of data points that share one or more associations 120 or between deterministic and stochastic data. These clusters can be interpreted as groups of data points that reflect specific inherent stochastic relationships 128. Reorganizing the raw data 108 to into one or more association clusters 132 may additionally include assigning each data point to its respective cluster or group, adding a cluster label to the data. This step creates a new dataset organized around the identified associations.

With continued reference to FIG. 1, association clusters 132 may be generated by plotting raw data 108 along a continuum. As used in the current disclosure, a "continuum" is a spectrum or a range of values, qualities, or attributes that exist along a single dimension or scale. A continuum may represent a continuous progression from one extreme to another, without any clear-cut boundaries or discrete categories. In a continuum, there are no distinct breakpoints or divisions, but instead, there is a gradual transition or progression from one end to the other. In some embodiments, a continuum may represent qualitative traits that exist on a spectrum. In a non-limiting example, a continuum may represent the degree of relevance a given datapoint of stochastic data 116 has to a target of deterministic data 120. A cluster may be formed by plotting a plurality of continuums, wherein each continuum represents one more trait or characteristic of an entity. In some embodiments, multiple continuums may be combined to generate an XY axis or an XYZ axis.

Figure 2:
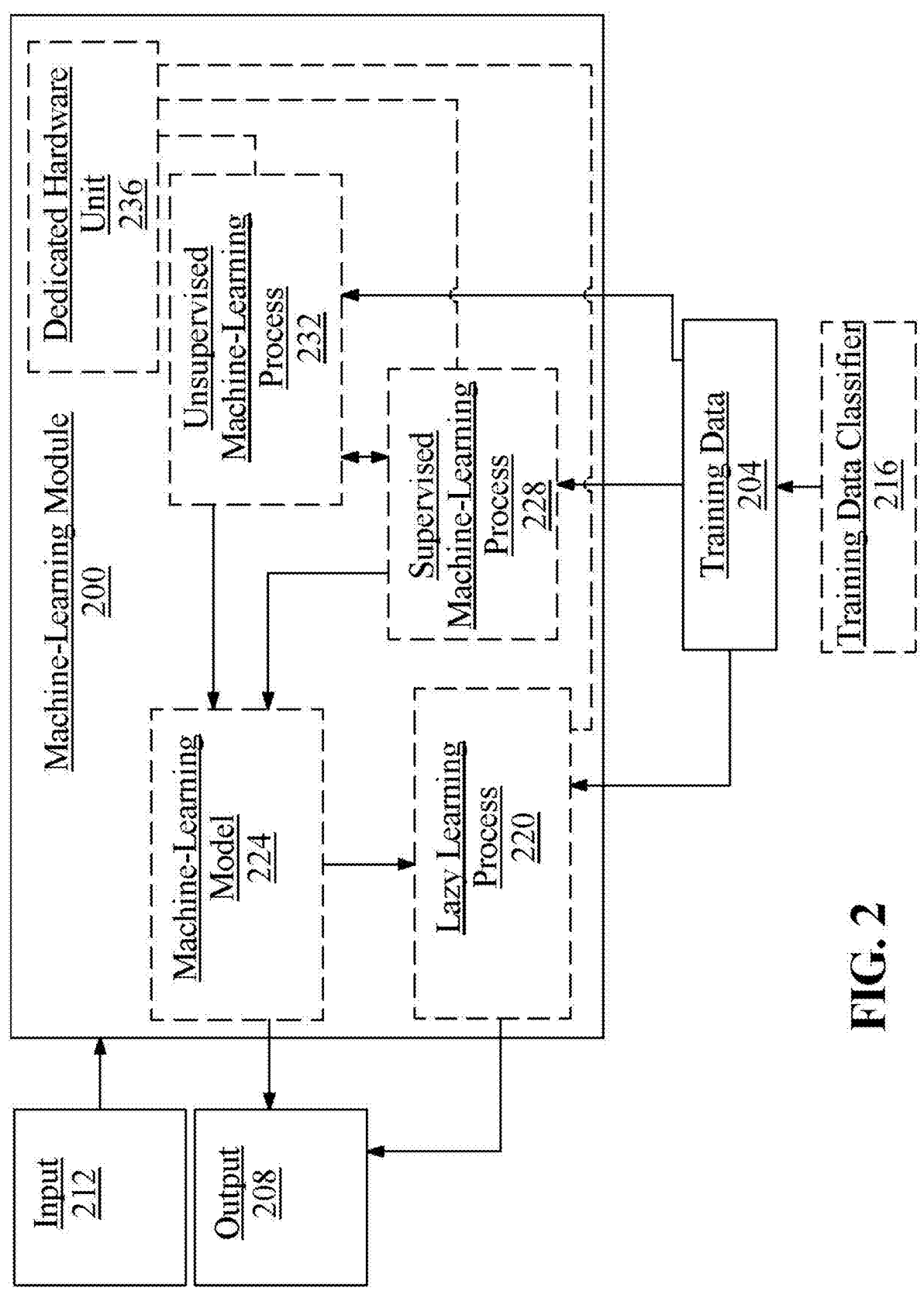
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements May be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, a plurality of deterministic data 112 and a plurality of stochastic data 116 as inputs correlated to one or more associations 120 as outputs.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to one or more targets of the entity that are associated with the deterministic data 112 and the stochastic data 116.

With further reference to FIG. 2, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may identify as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean upside-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of deterministic data 112 and a plurality of stochastic data 116 as described above as inputs, one or more associations 120 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
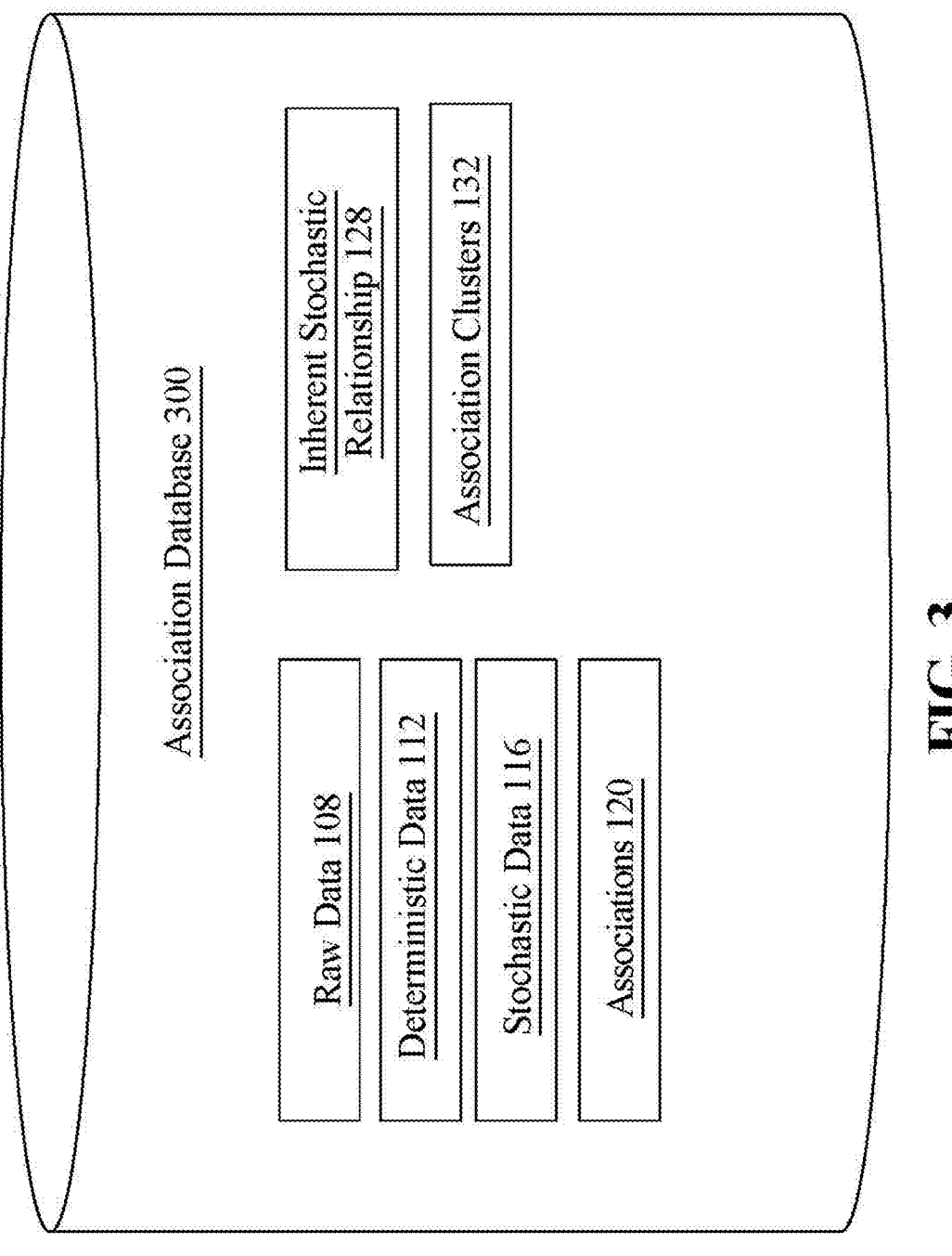
FIG. 3 is a block diagram of an exemplary embodiment of an association database.

Now referring to FIG. 3, an exemplary association database 300 is illustrated by way of block diagram. In an embodiment, any past or present versions of any data disclosed herein may be stored within the association database 300 including but not limited to: raw data 108, a plurality of datasets, deterministic data 112, stochastic data 116, a plurality of associations 120, inherent stochastic relationships 128, association clusters 132, and the like. Processor 104 may be communicatively connected with association database 300. For example, in some cases, database 300 may be local to processor 104. Alternatively, or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. association database 300 may be implemented, without limitation, as a relational database, a key-value retrieval database such as a NOSQL database, or any other format or structure for use as a database that a person skilled in the art would recognize as suitable upon review of the entirety of this disclosure. association database 300 may alternatively or additionally be implemented using a distributed data storage protocol and/or data structure, such as a distributed hash table or the like. association database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
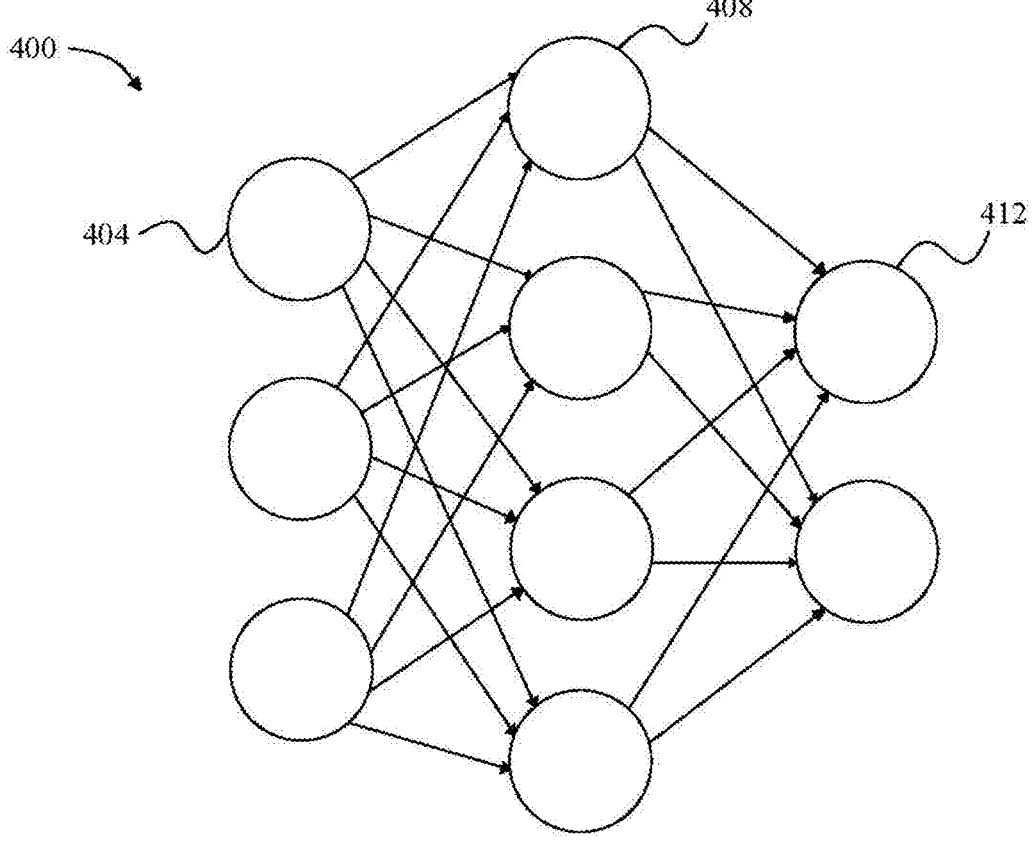
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
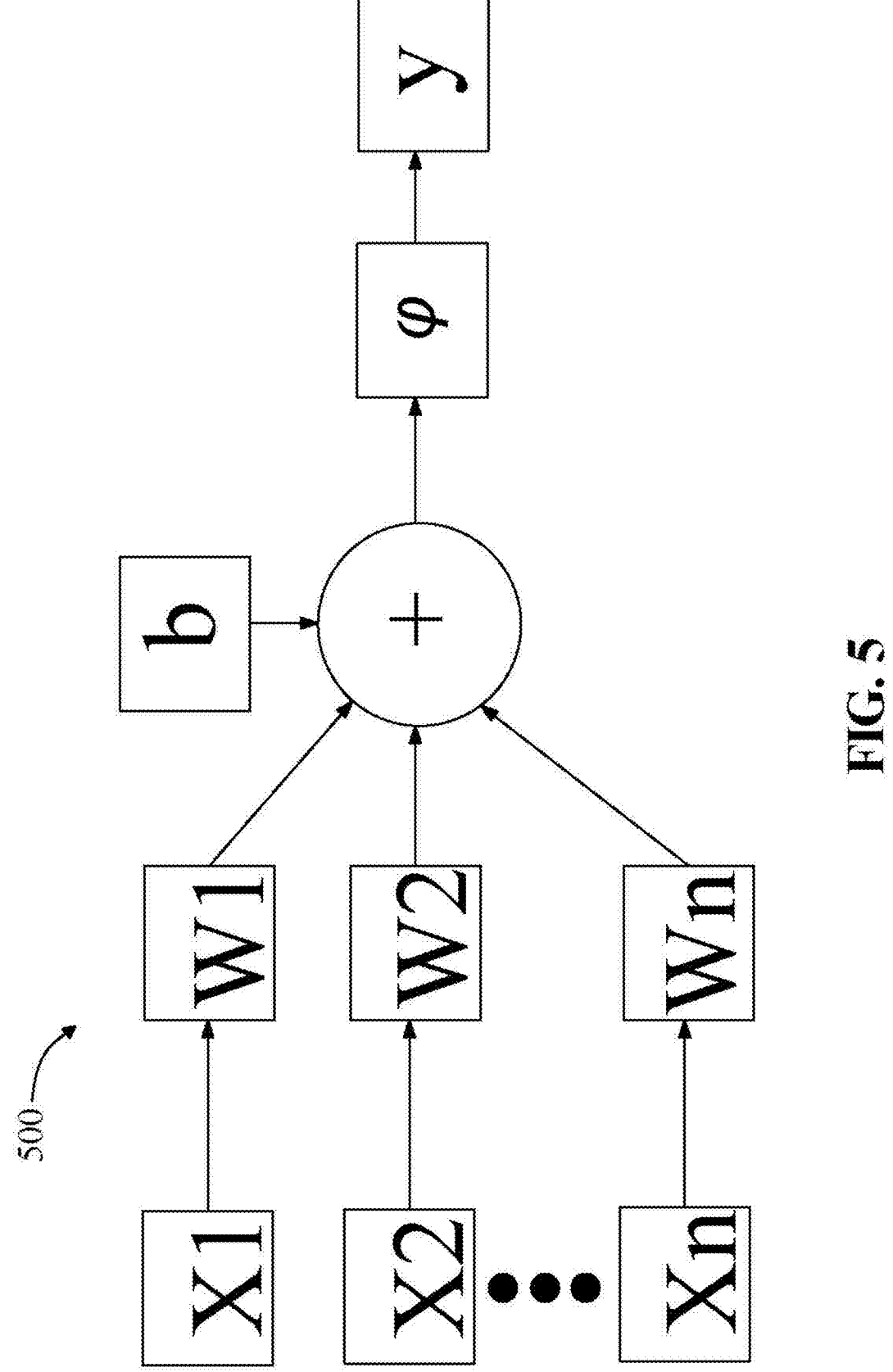
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
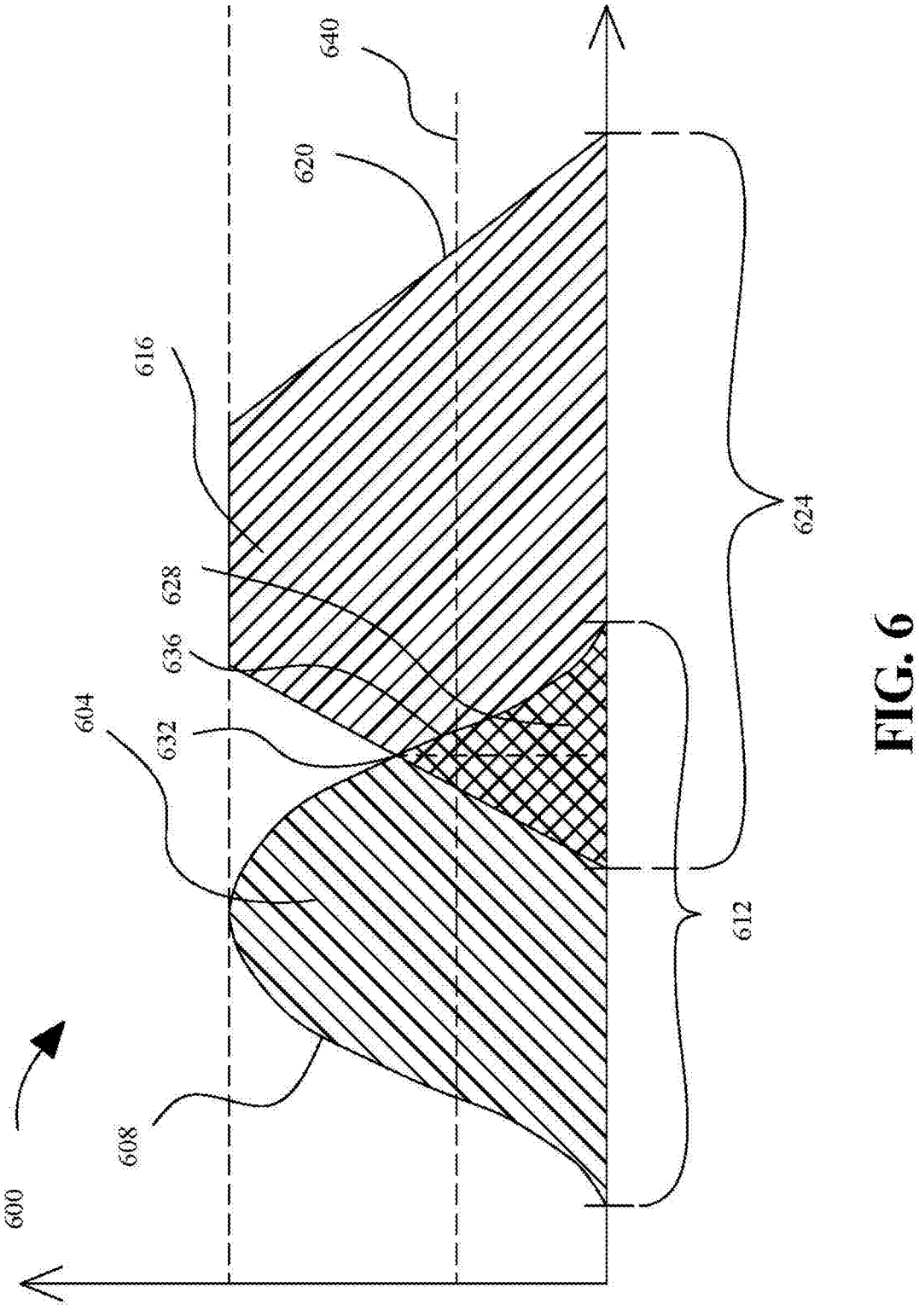
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example, and without limitation, the parameters, weights, and/or coefficients of the membership functions may be tuned using any machine-learning methods for the name/version matching as described herein. In another non-limiting embodiment, the fuzzy set may represent a deterministic data 112 and a stochastic data 116 from FIG. 1.

Alternatively, or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility thresholds using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input deterministic data 112 and stochastic data 116. For instance, an acceptance variable may represent a first measurable value pertaining to the classification of deterministic data 112 to stochastic data 116. Continuing the example, an output variable may represent one or more associations 120 associated with the user. In an embodiment, deterministic data 112 and/or stochastic data 116 may be represented by their own fuzzy set. In other embodiments, the classification of the data into one or more associations 120 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \dfrac{x-a}{b-a}, \text{ for } a \le x < b \\ \dfrac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any deterministic data 112 and stochastic data 116. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively, or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, the classification into one or more query categories may indicate a sufficient degree of overlap with fuzzy set representing deterministic data 112 and stochastic data 116 for combination to occur as described above. Each threshold may be established by one or more user inputs. Alternatively, or additionally, each threshold may be tuned by a machine-learning and/or statistical process, for instance and without limitation as described in further detail below.

In an embodiment, a degree of match between fuzzy sets may be used to rank one resource against another. For instance, if both deterministic data 112 and stochastic data 116 have fuzzy sets, one or more associations 120 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
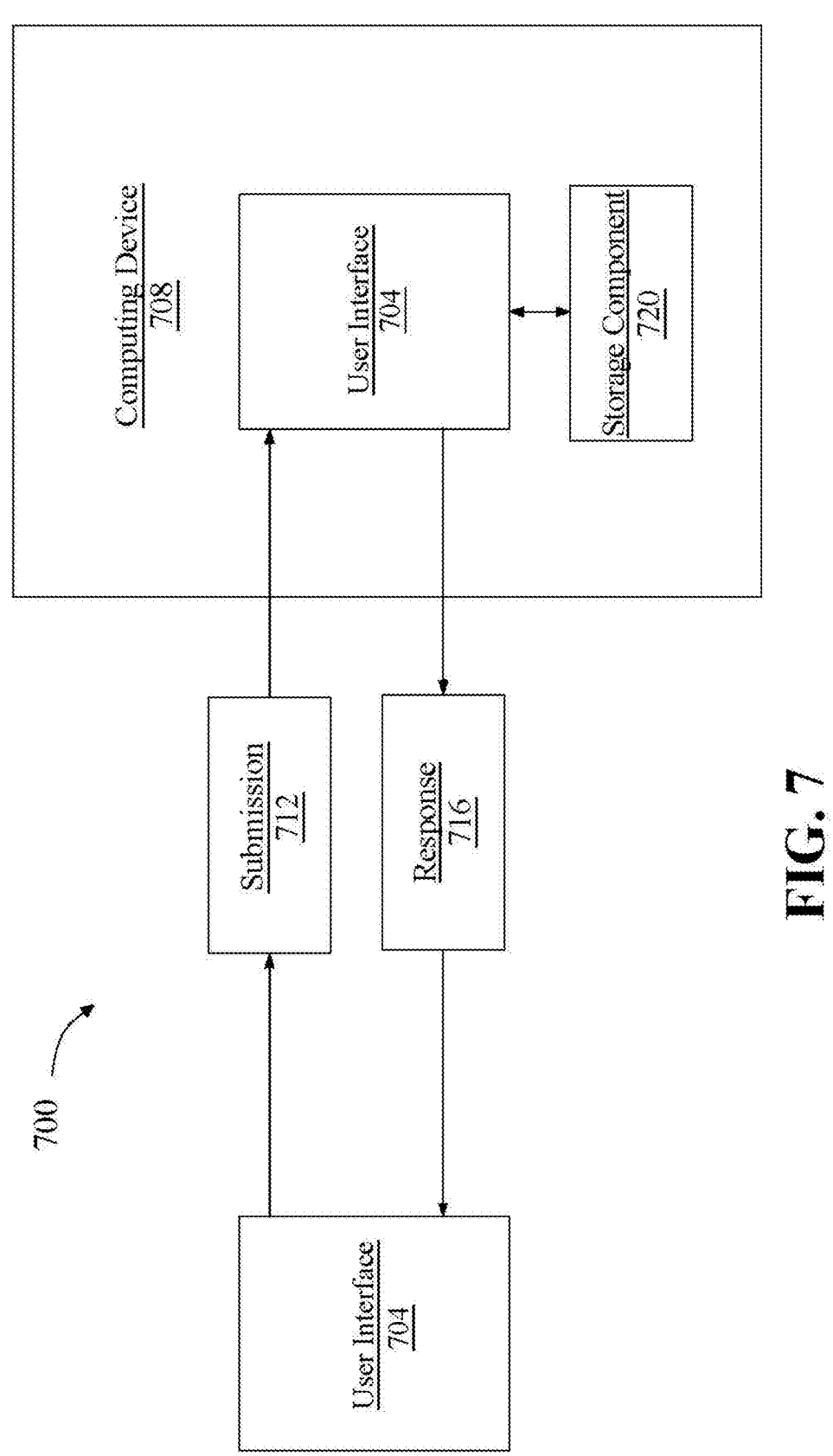
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively, or additionally, in some cases, user interface 704 may remote to computing device 708 and communicative with the computing device 708, by way of one or more networks, such as without limitation the internet. Alternatively, or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both submission 712 and response 716 are text-based communication. Alternatively, or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes a submission 712 using one or more of keyword recognition, pattern matching, and natural language processing. In some embodiments, processor employs real-time learning with evolutionary algorithms. In some cases, processor may retrieve a pre-prepared response from at least a storage component 720, based upon submission 712. Alternatively, or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry presents within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the user's entry into the chatbot as a function of a chatbot input. As used in the current disclosure, "Chatbot input" is any response that a candidate or employer inputs into a chatbot as a response to a prompt or question.

With continuing reference to FIG. 7, computing device 708 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively, or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
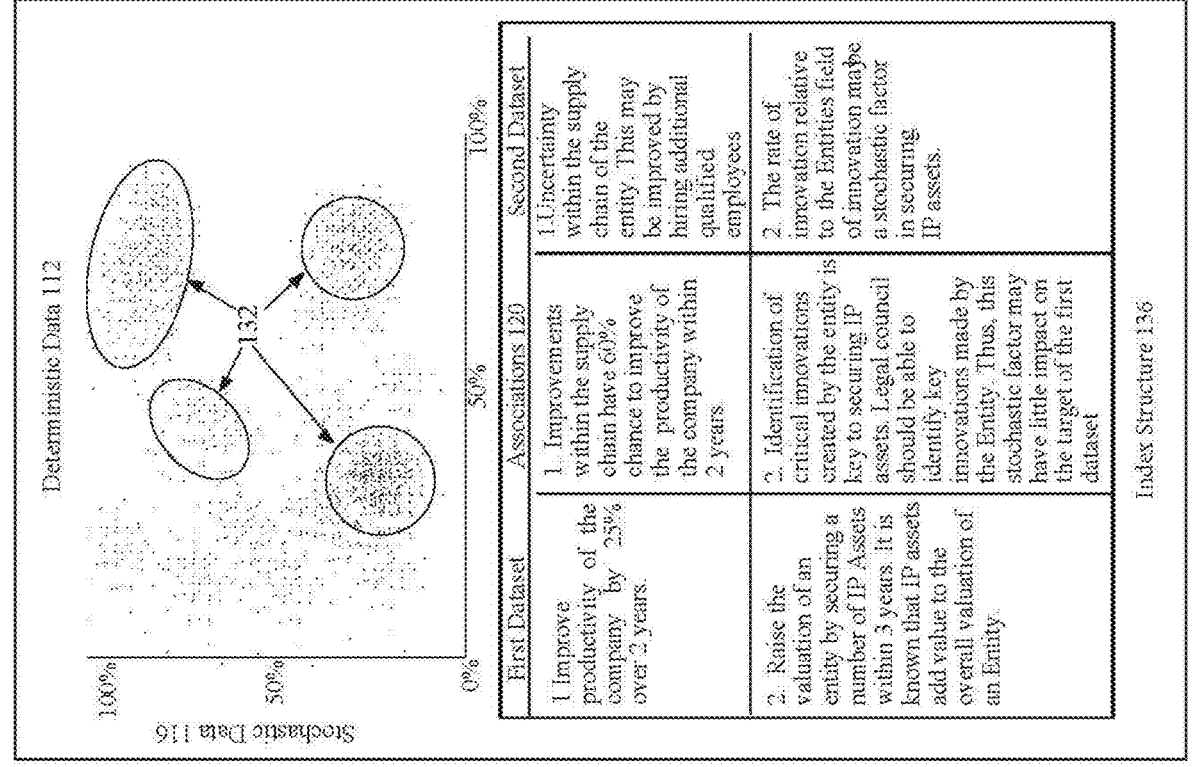
FIG. 8 is an illustration of an exemplary embodiment of user interface.

Referring now to FIG. 8, an exemplary embodiment of a user interface 800 is disclosed. The user interface 800 may be used to display an index structure 136 and/or association clusters 132. The user interface 800 may include one or more multi-faceted visualization panels that dynamically represent the complex interplay between the deterministic and stochastic data sets. This panel may toggle between various views, including a network graph for visualizing association clusters. In an embodiment, as the indexing system updates the index structure 136 as a function of new raw data 108 the user interface 800 may additionally be updated. In some cases, Deterministic data 112 points may be distinctly colored or shaped in contrast to stochastic data points, allowing for immediate visual differentiation. In addition to the primary visualization, the user interface 800 may include interactive elements such as sliders and filters, enabling users to refine their view based on specific parameters like time range, data intensity, or probability thresholds. Tooltips and hover-over information boxes may provide detailed information about specific data points or clusters when the user navigates over them. The interface may also feature a dedicated analytics sidebar, offering statistical insights and summaries of the data being viewed, such as the number of clusters identified, key attributes of selected data points, and predictive analytics results. This sidebar can be expanded or collapsed as per the user's preference. Furthermore, the interface may support the capability to export customized reports or visualizations based on the displayed data, facilitating easy sharing and communication of insights.

Figure 9:
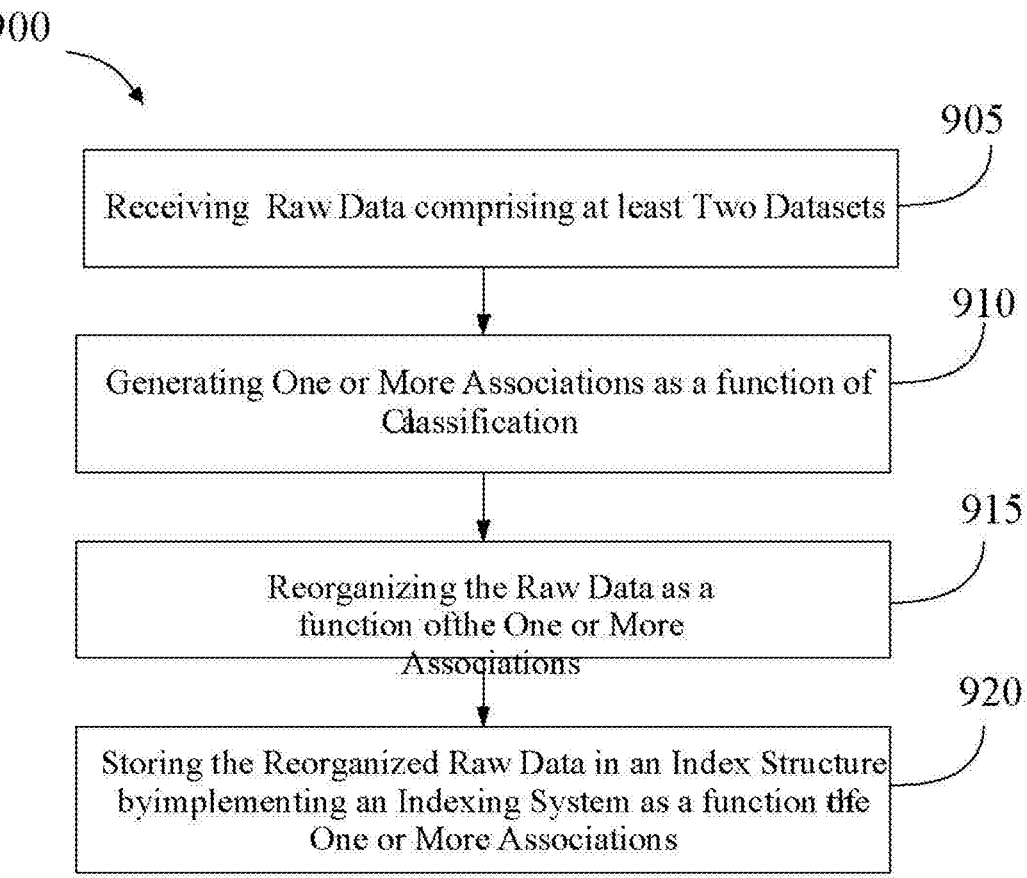
FIG. 9 is a flow diagram of an exemplary method for heuristic re-indexing of stochastic data to optimize data storage and retrieval efficiency.

Referring now to FIG. 9, a flow diagram of an exemplary method 900 for heuristic re-indexing of stochastic data to optimize data storage and retrieval efficiency is illustrated. At step 905, method 900 includes receiving, using at least a processor, raw data, wherein the raw data comprises at least two datasets. The at least two datasets include a first dataset having a plurality of deterministic data and a second dataset having a plurality of stochastic data. This may be implemented as described and with reference to FIGS. 1-8. In an embodiment, receiving the raw data may include receiving the raw data using one or more tracking cookies and/or a web crawler.

Still referring to FIG. 9, at step 910, method 900 includes generating, using the at least a processor, one or more associations as a function of a classification of the plurality of stochastic data within the second dataset to the plurality of deterministic data within the first dataset. This may be implemented as described and with reference to FIGS. 1-8. In an embodiment, generating the one or more associations may include iteratively training an association classifier using association training data, wherein the association training data comprises the plurality of deterministic data and the plurality of stochastic data as inputs correlated to examples of the one or more associations as outputs. Additionally, generating the one or more associations may include classifying the plurality of stochastic data within the second dataset to the plurality of deterministic data within the first dataset using a trained association classifier and generating the one or more associations as a function of the classification.

Still referring to FIG. 9, at step 915, method 900 includes reorganizing, using the at least a processor, the raw data as a function of the one or more associations. This may be implemented as described and with reference to FIGS. 1-8. In an embodiment, the one or more associations may be reflected using one or more p-values. In an additional embodiment, the method further includes identifying, using the at least a processor, at least an inherent stochastic relationship within the at least two datasets as a function of the one or more associations. The identification of the at least an inherent stochastic relationship may be done using a statistical model. In an embodiment, the index structure may include a self-balancing tree structure.

Still referring to FIG. 9, at step 920, method 900 includes storing the reorganized raw data in an index structure by implementing an indexing system as a function of the one or more associations, wherein the indexing system is further configured to dynamically adjust the index structure in response to additional raw data. This may be implemented as described and with reference to FIGS. 1-8. In an embodiment, reorganizing the raw data may include generating one or more association clusters as a function of the one or more associations. This may be done using one or more hierarchical clustering techniques.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
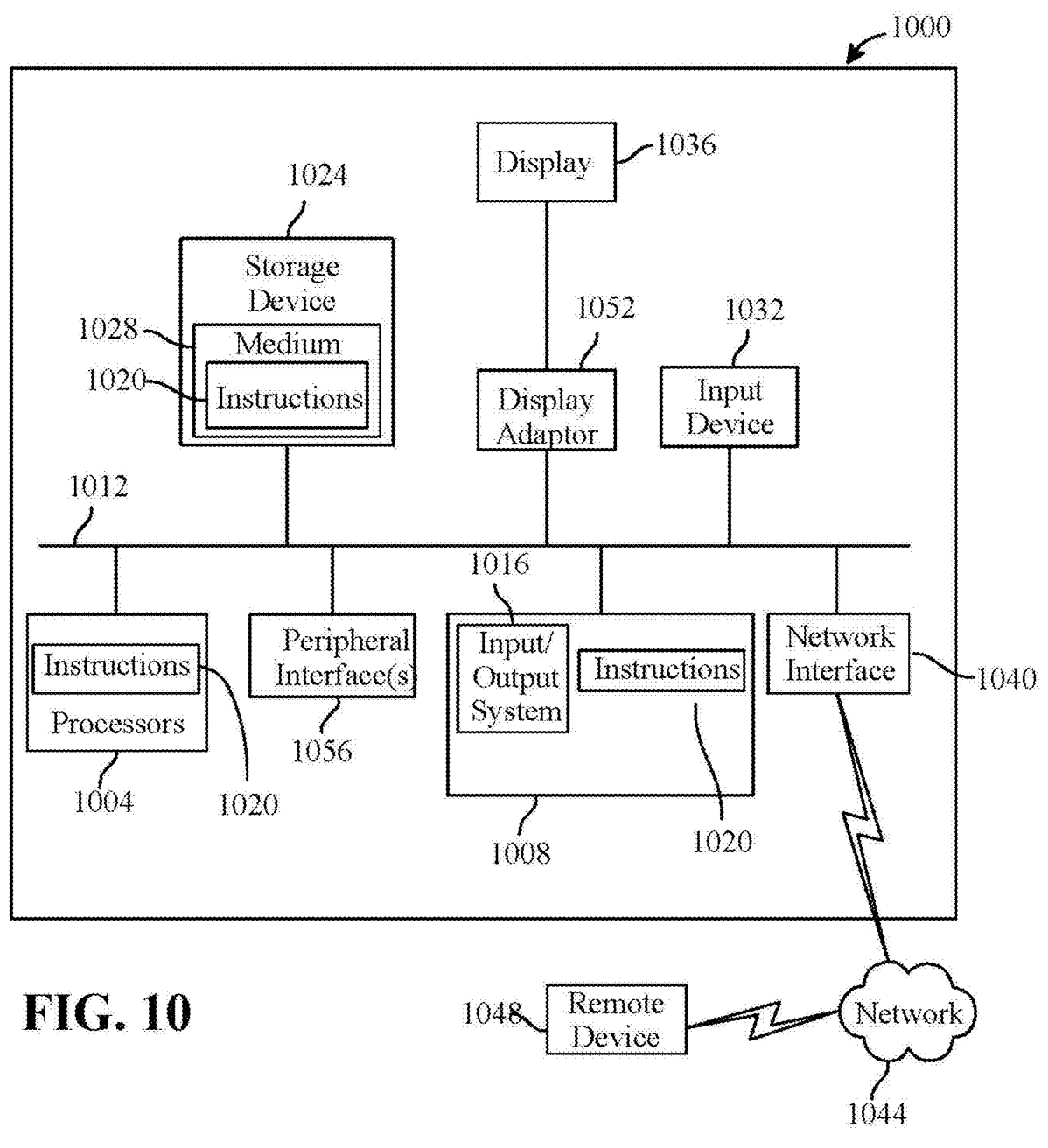
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for heuristic re-indexing of stochastic data to optimize data storage and retrieval efficiency, wherein the apparatus comprises:

at least a processor; and a memory communicatively connected to the at least a processor, wherein the memory contains instructions configuring the at least a processor to:

receive raw data, wherein the raw data comprises at least two datasets, wherein the at least two datasets comprise:

a first dataset having a plurality of deterministic data; and a second dataset having a plurality of stochastic data;

generate one or more associations of each one of the first and second data sets by:

defining a hypothesis for a statistical model to investigate;

selecting the statistical model from a plurality of statistical models; and fitting the statistical model to the raw data and the at least one or more associations to provide an estimate of variances, wherein the statistical model conducts hypothesis tests to assess a significance of relationships within the statistical model;

reorganize the raw data using a clustering function on the one or more associations; and store the reorganized raw data in an index structure by implementing an indexing system as a function of the one or more associations, wherein the indexing system is further configured to dynamically adjust the index structure in response to additional raw data, wherein the index structure comprises a self-balancing tree data structure, and wherein dynamically adjusting the index structure comprises automatically restructuring nodes of the self-balancing tree in response to insertions of the additional raw data to maintain balanced node depths during index maintenance operations.

2. The apparatus of claim 1, wherein the one or more associations are reflected using one or more association scores.

3. The apparatus of claim 1, wherein the one or more associations comprises at least an inherent stochastic relationship.

4. The apparatus of claim 1, wherein generating the one or more associations comprises generating the one or more associations using a p-value.

5. The apparatus of claim 1, wherein reorganizing the raw data comprises generating one or more association clusters as a function of the one or more associations.

6. The apparatus of claim 5, wherein generating one or more association clusters comprises generating the one or more association clusters using hierarchical clustering techniques.

7. The apparatus of claim 1, wherein generating the one or more associations comprises:

iteratively training an association classifier using association training data, wherein the association training data comprises a plurality of deterministic data and a plurality of stochastic data as inputs correlated to examples of the one or more associations as outputs; and classifying the plurality of stochastic data within the second dataset to the plurality of deterministic data within the first dataset using a trained association classifier; and generating the one or more associations as a function of the classification.

8. The apparatus of claim 1, wherein receiving the raw data comprises receiving the raw data using one or more tracking cookies.

9. The apparatus of claim 1, wherein receiving the raw data comprises receiving the raw data using a web crawler.

10. A method for heuristic re-indexing of stochastic data to optimize data storage and retrieval efficiency, wherein the method comprises:

receiving, using at least a processor, raw data, wherein the raw data comprises at least two datasets, wherein the at least two datasets comprise:

a first dataset having a plurality of deterministic data; and a second dataset having a plurality of stochastic data;

generating, using the at least a processor, one or more associations of each one of the first and second data sets by:

defining a hypothesis for a statistical model to investigate;

selecting the statistical model from a plurality of statistical models; and fitting the statistical model to the raw data and the at least one or more associations to provide an estimate of variances, wherein the statistical model conducts hypothesis tests to assess a significance of relationships within the statistical model;

reorganizing, using the at least a processor, the raw data using a clustering function on the one or more associations; and storing, using the at least a processor, the reorganized raw data in an index structure by implementing an indexing system as a function of the one or more associations, wherein the indexing system is further configured to dynamically adjust the index structure in response to additional raw data, wherein the index structure comprises a self-balancing tree data structure, and wherein dynamically adjusting the index structure comprises automatically restructuring nodes of the self-balancing tree in response to insertions of the additional raw data to maintain balanced node depths during index maintenance operations.

11. The method of claim 10, wherein the one or more associations are reflected using one or more association scores.

12. The method of claim 10, wherein the one or more associations comprises at least an inherent stochastic relationship.

13. The method of claim 10, wherein generating the one or more associations comprises generating the one or more associations using a p-value.

14. The method of claim 10, wherein reorganizing the raw data comprises generating one or more association clusters as a function of the one or more associations.

15. The method of claim 14, wherein generating one or more association clusters comprises generating the one or more association clusters using hierarchical clustering techniques.

16. The method of claim 10, wherein generating the one or more associations comprises:

iteratively training an association classifier using association training data, wherein the association training data comprises a plurality of deterministic data and a plurality of stochastic data as inputs correlated to examples of the one or more associations as outputs; and classifying the plurality of stochastic data within the second dataset to the plurality of deterministic data within the first dataset using a trained association classifier; and generating the one or more associations as a function of the classification.

17. The method of claim 10, wherein receiving the raw data comprises receiving the raw data using one or more tracking cookies.

18. The method of claim 10, wherein receiving the raw data comprises receiving the raw data using a web crawler.

* * * * *